United States Patent Office 3,407,214
Patented Oct. 22, 1968

3,407,214
5-HYDROXY-6-OXAGONAN-3-ONES
George H. Douglas, Paoli, Charles R. Walk, King of Prussia, and Herchel Smith, Wayne, Pa., assignors to American Home Products Corporation, New York, N.Y., a corporation of Delaware
No Drawing. Continuation-in-part of application Ser. No. 541,063, Apr. 8, 1966. This application Jan. 29, 1968, Ser. No. 701,048
10 Claims. (Cl. 260—345.3)

ABSTRACT OF THE DISCLOSURE

This invention is concerned with 5α-hydroxy-6-oxagonan-3-ones which are pharmacologically active in reducing blood cholesterol. Further, it relates to the process of preparing these compounds from their corresponding 6-oxagon-4-en-3-ones.

---

This application is a continuation-in-part of abandoned U.S. patent application, Ser. No. 541,063, filed on Apr. 8, 1966 and also entitled, "5-Hydroxy-6-Oxagonan-3-Ones."

This invention relates to new and useful steroids as well as to the novel method for their preparation. In particular, the present invention is concerned with 5α-hydroxy-6-oxagonan-3-ones which have demonstrated hypocholesterolemic properties when tested under standard and accepted pharmacological procedures.

The novel compounds which are included within the scope of this invention are represented by the following formula:

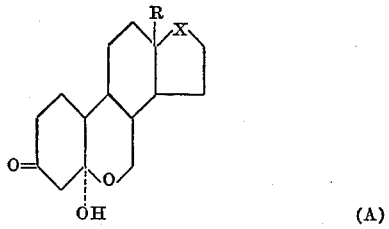

(A)

wherein X is selected from the group consisting of carbonyl, hydroxymethylene, halo(lower)alkynylhydroxymethylene, mono(lower)alkylaminomethylene and di-(lower)alkylaminomethylene; and R is lower alkyl. Examples of such compounds include: dl-13-ethyl-5α,17β-dihydroxy-6-oxagonan-3-one; dl-5α-hydroxy-13-methyl-6-oxagonan-3,17-dione; dl-17α-chlorethynyl-13-ethyl-5α,17β-dihydroxy-6-oxagonan-3-one and dl-5α-hydroxy-17β-[isohexyl(methyl)amino]-13-methyl-6-oxagonan-3-one.

In accord with the new and novel process of the present invention, the compounds of this invention may be prepared by the reaction of a 6-oxagon-4-en-3-one of the formula:

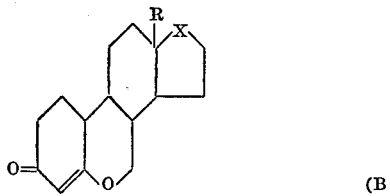

(B)

wherein X and R are defined as above, with an alkali metal hydroxide in a reaction-inert solvent at a temperature from about 20° C. to about 75° C. for a period of about two to eighty hours. The reaction mixture is then adjusted to a pH of about 7 by the addition of an acid. Thereafter, the product is separated and purified by conventional methods, such as, extraction, concentration and crystallization.

These time and temperature ranges are not critical and simply represent the most convenient ranges consistent with carrying out the reaction in a minimum of time without undue difficulty. Thus reaction temperatures appreciably below these can be used but their use considerably extends the reaction time. Similarly, reaction temperatures higher than those mentioned can be employed with a concomitant decrease in reaction time. By reaction-inert solvent is meant a liquid which dissolves the reactants and does not prevent their interaction. Among the preferred solvents are alkanols, glycol ethers such as 2-methoxy ethanol, 2-ethoxy ethanol, methoxy and ethoxy propanol, as well as amides such as dimethylformamide. The amount of solvent used is not critical, it being only necessary to use sufficient solvent to provide a reaction medium for the reactants. The acid employed to neutralize the reaction mixture may be any appropriate organic or inorganic acid, for example, acetic, citric, tartaric, lactic, hydrochloric, sulfuric and phosporic acid.

Another process for the production of the compounds of this invention involves the reaction of a 3-alkoxy-6-oxagona-2,5(10)-diene of the formula:

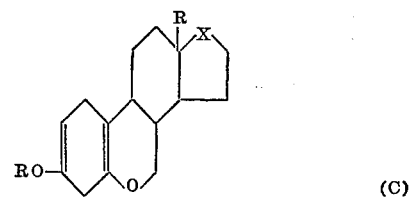

(C)

wherein X and both R's are defined as above, with a mineral acid. The mixture is then neutralized by the addition of a base and the product separated and purified by conventional procedures. Preferably this reaction is conducted with concentrated hydrochloric acid and neutralized with sodium bicarbonate.

The 17-mono(lower)alkylamino-6-oxagon-4-en-3-ones, the 17-di(lower)alkylamino-6-oxagon-4-en-3-ones and their corresponding 6-oxagona-2,5(10)-dienes employed as reactants in the above processes may be prepared by the procedure described in copending application, "13-Alkyl-17-Alkylamino-6-Oxagonanes," Ser. No. 536,361, by Douglas et al., filed on Mar. 22, 1966. The remainder of the 6-oxagon-4-en-3-one and 6-oxagona-2,5(10)-diene reactants may be prepared by the procedure described in copending application, "13β-Alkyl-6-Oxagonanes," Ser. No. 483,528, by Gordon A. Hughes and Herchel Smith, filed on Aug. 30, 1965.

The new and novel steroids of the present invention possess valuable pharmacological activity. In particular, these compounds in standard pharmacological procedures demonstrate blood cholesterol lowering activity indicating their usefulness as hypocholesterolemic agents.

In the pharmacological evaluation of the blood cholesterol lowering properties of the compounds of this invention the in vivo effects thereof are tested by the procedure described by Edgren, R. A., in the J. Atheroscler. Res. vol. 3, 206–209 (1963). When tested by this procedure at a dose of 5 mg./kilo, the compounds of this invention have demonstrated a potency in reducing blood cholesterol which is estimated to be 1.6 greater than the standard estrone without producing any significant feminization of the test animal.

When the compounds of this invention are employed to reduce the cholesterol blood level in warm-blooded animals, e.g. rats, they may be administered alone or in combination with pharmacologically acceptable carriers, the proportion of which is determined by the solubility and chemical nature of the compound, chosen route of administration and standard biological practice. For example, they may be administered orally as solids containing such excipients as starch, milk sugar, certain types of clay and so forth. They may be administered orally in the form of solutions or they may be injected parenterally, that is, intramuscularly intravenously or subcutaneously. For parenteral administration they may be used in the form of a sterile solution containing other solutes, for example, enough saline or glucose to make the solution isotonic.

The dosage of the present therapeutic agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects and preferably at a level that is in the range of from about 0.1 mg. to about 20.0 mg. per kg. of body weight per day, although as aforementioned variations will occur. However, a dosage level that is in the range of about 0.5 mg. to about 10.0 mg. per kg. of body weight per day is most desirably employed in order to achieve effective results.

The following examples are given by way of illustration and are not to be construed as limitations of this invention, many variations of which are possible without departing from the scope.

EXAMPLE I dl - 17α - chloroethynyl-13-ethyl-6-oxagon-4-en-3-one- (0.5 g.) is dissolved in ethanol (50 ml.) and treated with a 20 percent sodium hydroxide solution (1.5 ml.) for seventy-two hours, at 25° C. Subsequently, the mixture is neutralized carefully with acetic acid (pH 6 to 7), diluted with water, extracted with ether and the ether extract dried and evaporated. The product is crystallized from ether to give dl - 17α-chloroethynyl-13-ethyl-5α,17-dihydroxy-6-oxagonan-3-one, M.P. 159–162° C. UV, no absorption about 200 mμ $\lambda_{max.}^{KBr}$ 2.95, 3.13, 4.55 and 5.8μ

Analysis.—Calc'd for $C_{20}H_{27}ClO_4$: C, 65.46; H. 7.42; Cl, 9.67. Found: C, 65.65; H, 7.51; Cl, 9.5.

Employing the aforesaid procedure the following compounds are prepared:

dl - 17α - bromoethynyl-5α,17-dihydroxy-13-methyl-6-oxagonan-3-one; and dl - 17α - (2 - butynyl) - 5α,17α - dihydroxy - 13-methyl-6-oxagonan-3-one.

EXAMPLE II dl - 17 - hydroxy - 13 - methyl - 17α - (1 - propynyl)-6-oxagon-4-en-3-one (0.5 g.) is dissolved in methanol (50 ml.) and treated with a 40 percent potassium hydroxide solution (0.8 ml.) for ten hours at 50° C. Thereafter, the mixture is neutralized with hydrochloric acid, diluted with water, extracted with chloroform, dried and evaporated with dryness. In this manner, is obtained dl-5α-17-dihydroxy - 13 - methyl-17α-(1-propynyl)-6-oxagonan-3-one.

EXAMPLE III dl - N - isohexyl - 3 - methoxy - N,13 - dimethyl - 6-oxagona-2,5(10)-dien-17β-amine (400 mg.) is stirred for three hours at room temperature in water (38 ml.) containing concentrated aqueous hydrochloric acid (4 ml.). The mixture is then poured into water and neutralized with saturated aqueous sodium bicarbonate. Ether is added and the organic layer separated and washed with water, 2 percent aqueous sodium hydroxide, water and finally dried over anhydrous sodium sulfate. The residue is crystallized from hexane to yield dl-5α-hydroxy-17β-[isohexyl(methyl)amino] - 13-methyl-6-oxagonan-3-one 70 mg., M.P. 166–169° C. No UV absorption above 200 mμ $\lambda_{max.}^{KBr}$ 3.07; 3.15, 5.85μ

Analysis.—Calc'd for $C_{24}H_{41}O_3N$: C, 73.61; H, 10.55; N, 3.58. Found: C, 73.76; H, 10.72; N, 3.88.

EXAMPLE IV dl - 13 - ethyl - 17α - ethynyl - 17 - hydroxy - 6 - oxagon-4-en-one (1.0 g.) is dissolved in butanol (100 ml.) and treated with a 10 percent sodium hydroxide solution (7.0 ml.) for two hours at 70° C. Thereafter, the mixture is neutralized with citric acid, diluted with water, extracted with carbon tetrachloride, dried over anhydrous sodium sulfate and evaporated to dryness under vacuum. The residue is recrystallized from ether to yield dl-13-ethyl-17α-ethynyl-5α,17-dihydroxy-6-oxagonan-3-one.

EXAMPLE V dl - 17α - (13 - iodo - 2 - propynyl) - 17 - hydroxy-13 - methyl - 6-oxagon-4-en-3-one (10 g.) is dissolved in tetrahydrofuran (100 ml.) and treated with a 15 percent sodium hydroxide solution (6.0 ml.) for five hours at 50° C. Thereafter the mixture is neutralized with tartaric acid, diluted with water, extracted with toluene, dried over anhydrous sodium sulfate and evaporated to dryness under vacuum. The residue is recrystallized from chloroform to yield dl - 17α - (3-iodo-2-propynyl)-5α,17-dihydroxy-13-methyl-6-oxagonan-3-one.

EXAMPLE VI dl - 13 - ethyl - 17β - (N,N - dimethylamino) - 6-oxagon-4-en-3-one (0.3 g.) is dissolved in butanol (35 ml.) and treated with 10 percent sodium hydroxide solution (2.5 ml.) for sixty hours at 30° C. Thereafter, the mixture is neutralized with dilute sulfuric acid, diluted with water, extracted with ether, dried over anhydrous sodium sulfate and evaporated to dryness under vacuum. The residue is recrystallized from ether to yield dl-13-ethyl - 5α-hydroxy-17β-(N,N-dimethylamino-6-oxagonan-3-one.

In a similar manner, dl-17β-(N,N-dimethylamino)-5α-hydroxy-13-propyl-6-oxagonan-3-one and dl-17β-(N,N-dibutylamino)-5α-hydroxy-13-methyl-6-oxagonan-3-one are produced.

EXAMPLE VII dl - 13 - ethyl-17β-[isohexyl(methyl)amino]-6-oxagon-4-en-3-one (1.0 g.) is dissolved in butanol (100 ml.) and treated with 25 percent potassium hydroxide solution (3.5 ml.) for ten hours at 45° C. Thereafter, the mixture is neutralized with malic acid, diluted with water, extracted with carbon tetrachloride, dried over anhydrous magnesium sulfate and evaporated to dryness under vacuum. The residue is recrystallized from ether to yield dl-13-ethyl - 5α - hydroxy - 17β - [isohexyl(methyl)amino] - 6-oxagonan-3-one.

Similarly, dl-5α-hydroxy-13-methyl-17β-[propyl(ethyl)-amino]-6-oxagonan-3-one is obtained.

What is claimed is:

1. A compound selected from the group consisting of those having the formula:

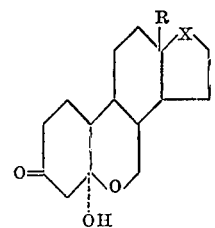

wherein X is selected from the group consisting of carbonyl, hydroxymethylene, halo(lower)alkynylhydroxymethylene, lower alkynylhydroxymethylene, mono(lower)alkylaminomethylene and di(lower)alkylaminomethylene; and R is lower alkyl.

2. A compound as described in claim 1 which is: dl-17α - chloroethynyl - 13 - ethyl-5α,17-dihydroxy-6-oxagonan-3-one.

3. A compound as described in claim 1 which is: dl-5α-hydroxy - 17β - [isohexyl(methyl)amino] - 13 - methyl-6-oxagonan-3-one.

4. A compound as described in claim 1 which is: dl-13-ethyl - 5α - hydroxy - 17β-(N,N-dimethylamino)-6-oxagonan-3-one.

5. A compound as described in claim 1 which is: dl-13-ethyl-5α,17β-dihydroxy-6-oxagonan-3-one.

6. A compound as described in claim 1 which is: dl-5α-hydroxy-13-methyl-6-oxagonan-3,17-dione.

7. A compound as described in claim 1 which is: dl-17α - (2 - butynyl) - 5α,17 - dihydroxy - 13 - methyl - 6-oxagonan-3-one.

8. A compound as described in claim 1 which is: dl-5α, 17 - dihydroxy - 13-methyl-17α-(1-propynyl)-6-oxagonan-3-one.

9. A process for the production of a compound of the formula:

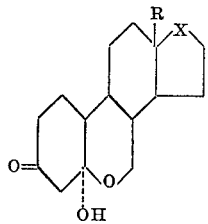

wherein X is selected from the group consisting of carbonyl, hydroxymethylene, halo(lower)alkynylhydroxymethylene, lower alkynylhydroxymethylene, lower alkylaminomethylene and di(lower)alkylaminomethylene; and R is lower alkyl, which comprises contacting a compound of the formula:

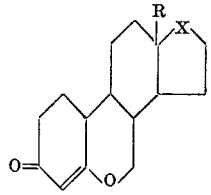

wherein X and R are defined as above, with an alkali metal hydroxide in a reaction-inert organic solvent at a temperature from about 20° C. to about 75° C. for a period of from about two to about eighty hours, and subsequently adjusting the pH of the mixture to about 7 by the addition of an acid.

10. A process as described in claim 9 wherein:
(a) the alkali metal hydroxide is sodium hydroxide,
(b) the reaction-inert organic solvent is ethanol,
(c) the acid is acetic acid, and
(d) the reaction is conducted at about 25° C. for about seventy hours.

References Cited

UNITED STATES PATENTS 3,080,380  3/1963  Atwater _____ 260—345.2

FOREIGN PATENTS 1,431,733  2/1966  France.

OTHER REFERENCES

Smith et al.: Experientia, vol. 20, pp. 418–9 (1964).

HENRY R. JILES, *Primary Examiner.*

J. M. FORD, *Assistant Examiner.*